United States Patent Office 3,261,861
Patented July 19, 1966

3,261,861
N-CYANO-GLYCINONITRILES PREPARATORY PROCESS
Francis Johnson, Newton Lower Falls, and Wilmonte A. Nasutavicus, Framingham, Mass., assignors to The Dow Chemical Company, Midland, Mich., a corporation of Delaware
No Drawing. Filed Oct. 2, 1963, Ser. No. 313,157
14 Claims. (Cl. 260—465)

This invention relates to an improved process for preparing N-cyano-glycinonitriles and to novel N-cyano-glycinonitriles. This application is a continuation-in-part of our co-pending application Serial No. 226,469, filed September 26, 1962.

It is an object of this invention to provide novel aryl substituted N-cyano-glycinonitriles. The invention also contemplates providing a novel process for preparing N-cyano-glycinonitriles. Other objects and advantages of the invention will in part be obvious and in part appear hereinafter.

We discovered that N-cyano-glycinonitriles may be advantageously prepared by reacting a cyanamide with a methyl cyanide having a reactive alpha substituent, in the presence of a suitable base according to the equation:

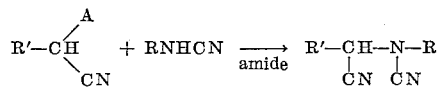

wherein R and R' may each be hydrogen or an aliphatic, cycloaliphatic or aryl group. They are preferably hydrogen, a lower alkyl group, a monocycloalkyl group (e.g. cyclopentyl), or a monocyclic aryl group. A is a halogen or the residue of an organic sulfonic acid having the formula —O—SO$_2$M, M being a hydrocarbon radical. The hydrocarbon portions of the reactants may contain substituent groups or radicals which do not react with the reactants or other material present in the reaction mixture. Illustrative of such substituents are the Cl, F, NO$_2$, SO$_2$, methoxy and phenyl groups. Illustrative of R and R' are butyl, octyl, cyclohexyl, cyclopentyl, phenyl, tolyl, xylyl, nitrophenyl, etc.

The reaction is carried out in a low molecular weight carboxylic acid amide solvent which may have both hydrogen atoms of the amide group substituted by low molecular weight alkyl functions. These include the preferred amides, formamide, dimethylformamide, dimethylacetamide, and N-formylmorpholine. An amine base such as the tertiary amine, e.g. triethylamine or pyridine, must be present to neutralize the acid produced. The reaction is carried out by mixing the reactants, preferably with agitation, at a temperature between 0° C. and 100° C. It is preferably held between about 0° C. and 50° C. Although the reaction may be carried in as short a period as one-half hour, at least two hours are usually preferred to obtain better yields. Substantially stoichiometric proportions of reactants are used.

For the purpose of further explaining the invention to those skilled in the art, the following illustrative examples are given:

Example 1

At approximately room temperature, 3.25 g. of chloroacetonitrile was added to a solution of 5.9 g. of phenylcyanamide and 5.1 g. of triethylamine in 25 ml. of dimethylformamide. The reaction mixture was stirred for six hours and triethylamine hydrochloride gradually precipitated from the solution. Ice water was then added to the reaction mixture, whereupon the triethylamine hydrochloride was dissolved and the desired N-cyano-N-phenylglycinonitrile was precipitated as a crystalline solid, yield 4.7 g., melting point (purified) 79–80° C.

Example 2

4.72 g. of phenylcyanamide in a solution containing 4 g. of triethylamine was reacted with 7.2 of α-chloro-o-methoxyphenylacetonitrile dissolved in dimethylformamide solution. Heat was evolved and the mixture changed color from pale yellow to orange. A precipitate began to appear within three minutes after the addition. The flask was cooled and the product removed, filtered, washed and dried. The recrystallized α-(o-methoxyphenyl)-N-cyano-N-phenylglycinonitrile produced melted at 64–65° C. and amounted to 8.9 g., a yield of 84% of the theoretical.

Example 3

5.9 g. of phenylcyamide and 0.05 g. of triethylamine in dimethylformamide solution were slowly combined with a dimethylformamide solution of 16 g. of o-chloromandelonitrile p-toluenesulfonate. The reaction mixture was stirred for four hours, cooled and the product separated out. A yield of 10 g. of crystalline α-(o-chlorophenyl) - N - cyano - N - phenylglycinonitrile melting at 107–8° C. was obtained.

Example 4

To a solution of 2.0 g. of phenylcyanamide in 4 ml. of anhydrous dimethylformamide was added 2.3 g. of redistilled triethylamine and 8.9 g. of 2,4-dichloro, α-cyanobenzyltosylate, dissolved in 15 ml. of anhydrous dimethylformamide. There was no precipitate but the reaction mixture became orange in color. After the reaction had stood 20 hours at room temperature, the addition of ice water affected the formation of an orange gum. The aqueous layer was decanted and the gum crystallized from ethanol; yield of α-(3,5-dichlorophenyl)-N-cyano-N-phenylglycinonitrile was 3.0 g. or 40%. The analytical sample was recrystallized from ethanol, M.P. 98–100° C.

Example 5

To a solution of 3 g. of phenylcyanamide in 5 ml. of anhydrous dimethylformamide was added 2.6 g. of triethylamine and 7.2 of α-cyanobenzyltosylate. The reaction flask was cooled in ice during the addition of the reactants. After allowing the reaction to stand for two hours at room temperatures ice water was added and the product precipitated out of solution. The product was removed by filtration, air dried, and crystallized from methylene chloride-ethyl ether and low boiling petroleum ether. The yield of α-phenyl-N-cyano-N-phenylglycinonitrile was 3.6 g. or 62%. The analytical sample was prepared from methylene chloride-ethyl ether, M.P. 105–7° C.

Example 6

Following the procedure of Example 1, cyanamide is reacted with the chloroacetonitrile to obtain N-cyanoglycinonitrile.

Example 7

Following the procedure of Example 1, butylcyanamide is reacted with the chloroacetonitrile to obtain N-cyano-N-butylglycinonitrile.

Example 8

Following the procedure of Example 1, cyclohexylcyanamide is reacted with the chloroacetonitrile to obtain N-cyano-N-cyclohexylglycinonitrile.

Example 9

Following the procedure of Example 4, α-cyanoactyltosylate is reacted with phenylcyanamide to obtain α-heptyl-N-cyano-N-phenylglycinonitrile.

Example 10

Following the procedure of Example 5, cyanamide was reacted with the α-cyanobenzyltosylate to obtain α-phenyl-N-cyanoglycinonitrile.

The aryl substituted N-cyano-glycinonitriles are biologically active. They are also active preemergent herbicides when applied to the seeds of such plants as beans, waterplant-moneywort, waterplant-salvenia, and waterplant-milfoil. They have also shown activity as fish repellants, and more particularly against carp. They have also shown activity as cockroach repellants and against plum curculio. The N-cyano-glycinonitriles are also useful as intermediates in the preparation of 2-halo-4-aminoimidazoles by the process disclosed in our patent application, Serial No. 226,469.

Although the invention has been illustrated by specific examples, it is to be understood that it includes all modifications and variations that come within the scope of the appended claims.

What is claimed is:

1. Aromatic N-cyano-glycinonitriles having the formula

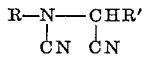

wherein R and R' are each selected from the group consisting of hydrogen, lower alkyls, monocycloalkyls, and monocyclic aryls, and at least one of said groups must be a monocyclic aryl.

2. α - (o - Methoxyphenyl) - N - cyano - N - phenylglycinonitrile.

3. α - (o - Chlorophenyl) - N - cyano - N - phenylglycinonitrile.

4. N-cyano-phenylglycinonitrile.

5. α-phenyl-N-cyano-N-phenylglycinonitrile.

6. α - (3,5 - dichlorophenyl) - N - cyano - N - phenylglycinonitrile.

7. A process for preparing N-cyano-glycinonitriles comprising reacting at a temperature between 0° C. and 100° C., a cyanamide having the formula RNHCN with a methyl cyanide having the formula

wherein R and R' are each selected from the group consisting of hydrogen, lower alkyls, monocycloalkyls, and monocyclic aryls, and A is selected from the group consisting of halides and sulfonyls, in the presence of an amine base in a carboxylic acid amide solvent.

8. The process of claim 7 wherein said amide solvent is selected from the group consisting of formamide, dimethylformamide, dimethylacetamide, and N-formylmorpholine.

9. The process of claim 7 wherein at least one of said R and R' groups is a monocyclic aryl.

10. The process of claim 8 wherein the reaction temperature is between 0° C. and 50° C.

11. The process of claim 9 wherein the reaction temperature is between 0° C. and 50° C.

12. The process of claim 10 wherein the base is a tertiary amine.

13. The process of claim 12 wherein the tertiary amine is selected from the group consisting of triethylamine and pyridine.

14. N-cyano-N-phenylglycinonitriles having the formula

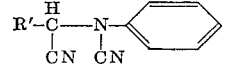

wherein R' is selected from the group consisting of hydrogen, lower alkyls, monocycloalkyls, and monocyclic aryls.

References Cited by the Examiner

UNITED STATES PATENTS 2,653,143   9/1953   Benneville et al. __ 260—465.5 X

CHARLES B. PARKER, *Primary Examiner.*

DALE R. MAHANAND, *Assistant Examiner.*